C. RASMUSSEN.
TIRE CUTTING MACHINE.
APPLICATION FILED APR. 8, 1920.
1,357,899.
Patented Nov. 2, 1920.
5 SHEETS—SHEET 1.
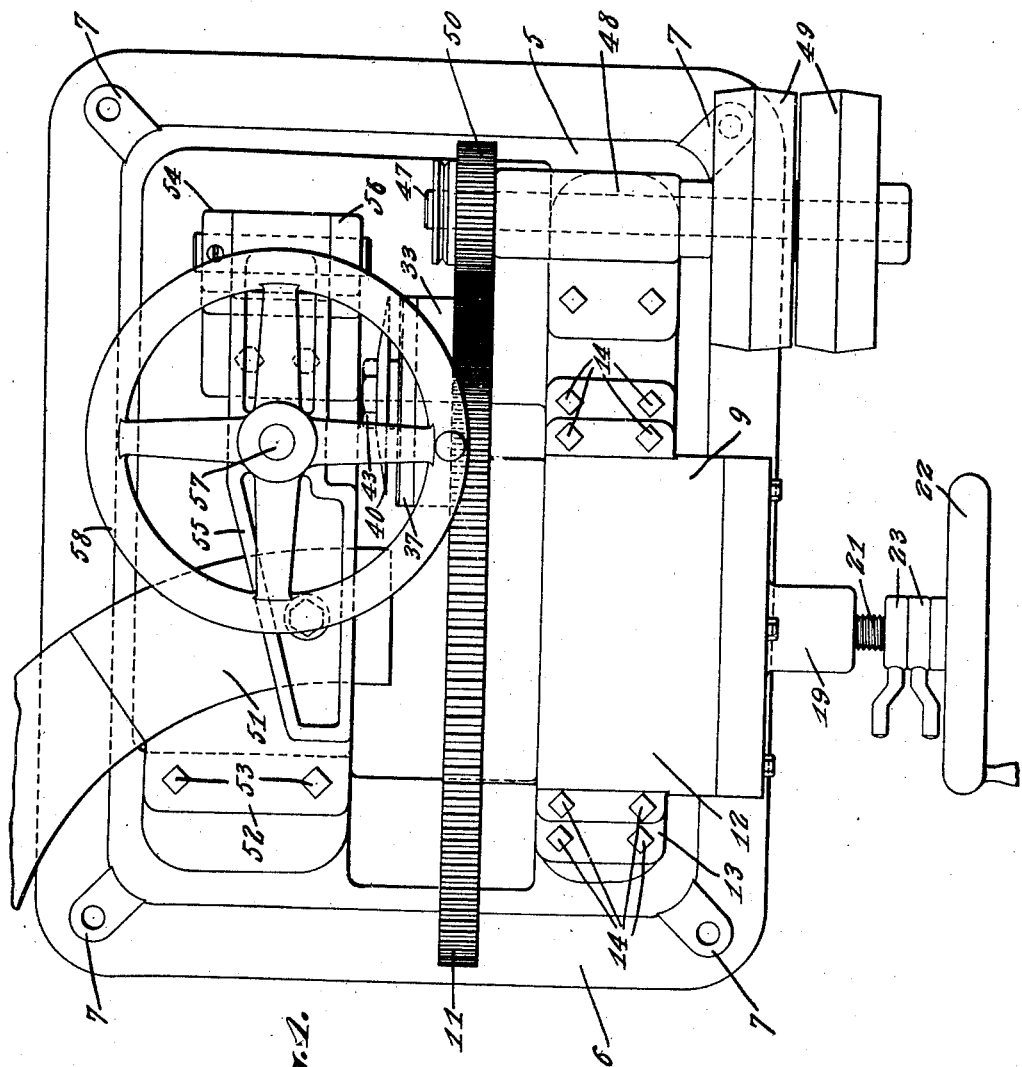
C. Rasmussen, Inventor
By C.A.Snow & Co.
Attorneys

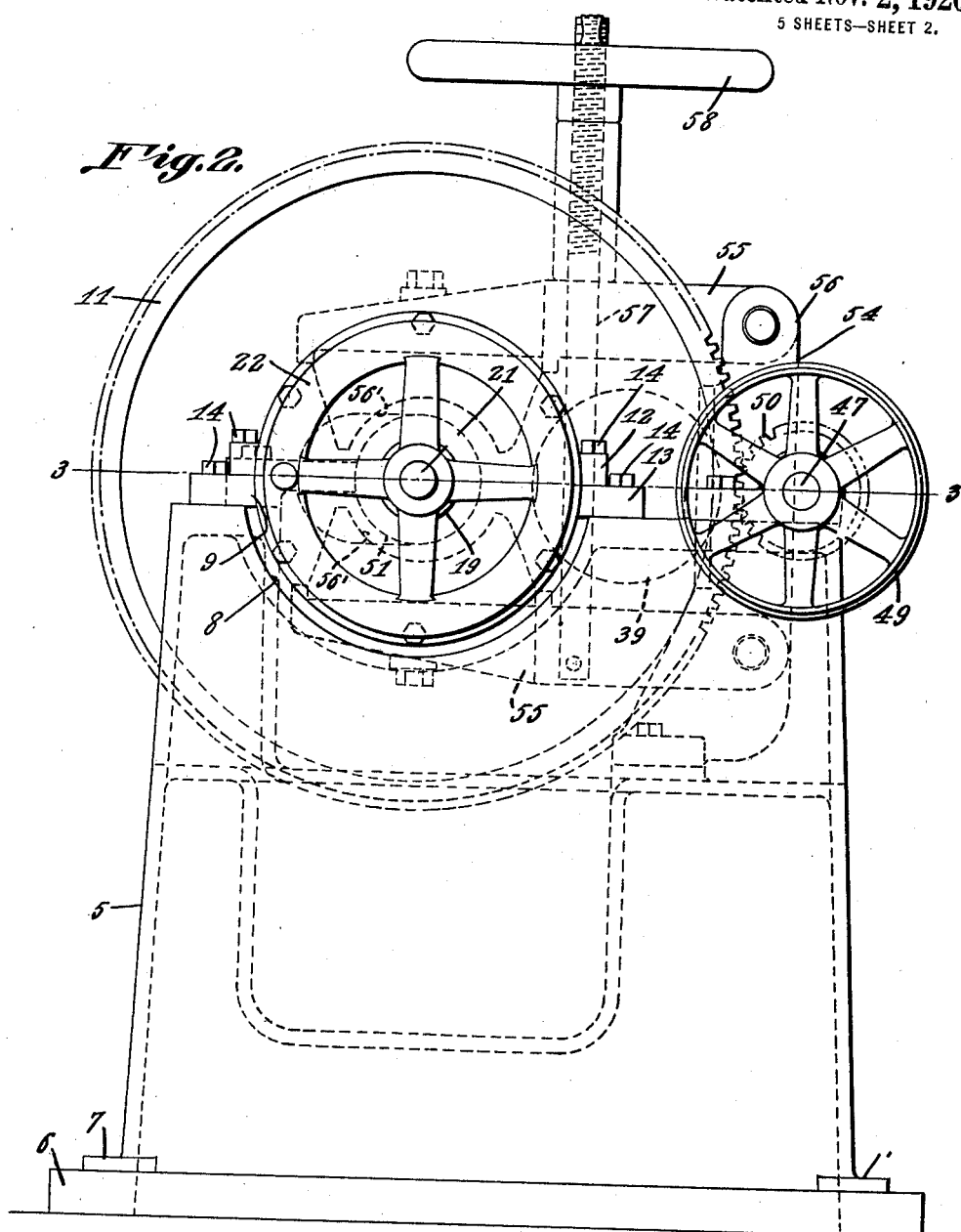

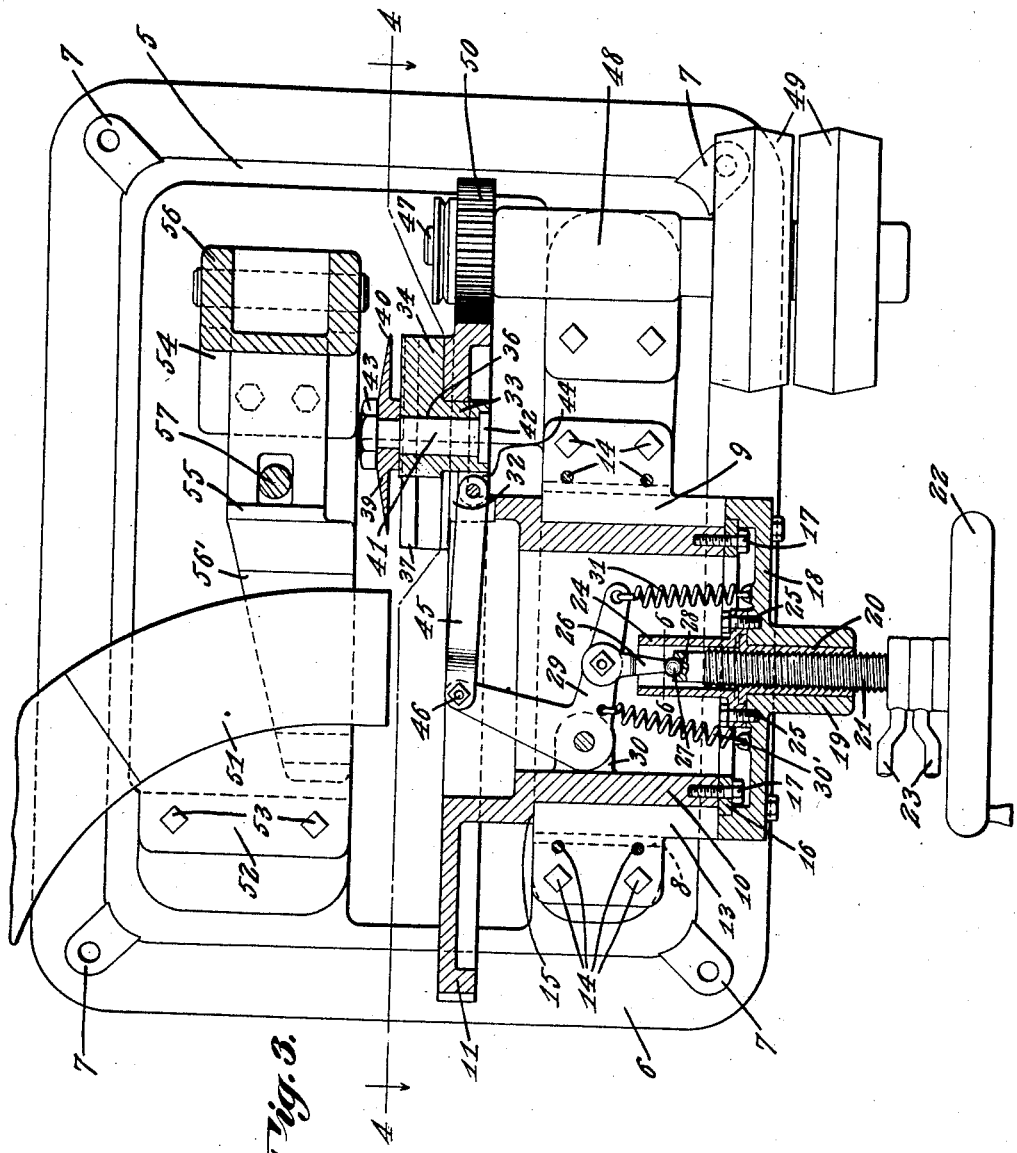

C. RASMUSSEN.
TIRE CUTTING MACHINE.
APPLICATION FILED APR. 8, 1920.
1,357,899.
Patented Nov. 2, 1920.
5 SHEETS—SHEET 4.
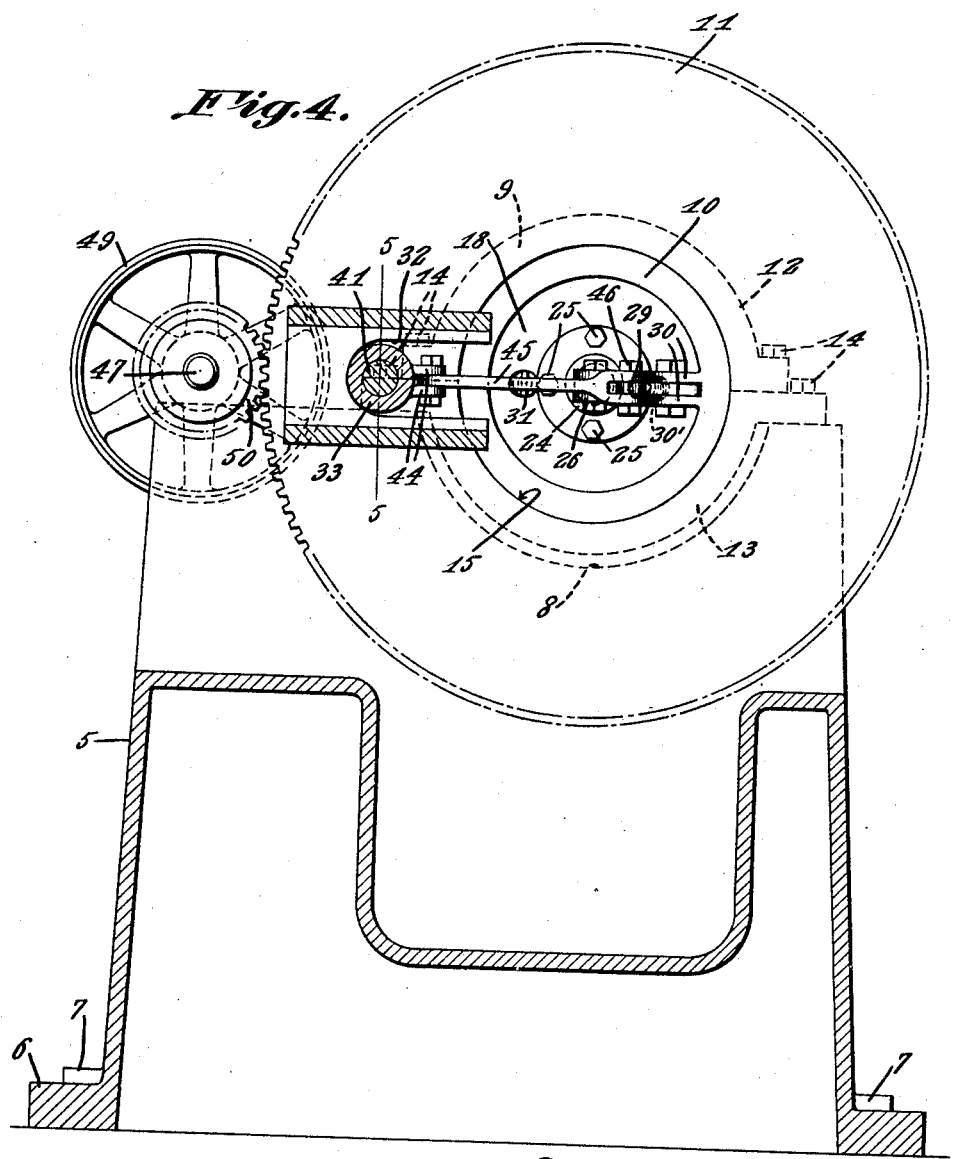
C. Rasmussen, Inventor
By C.A. Snow & Co.
Attorneys

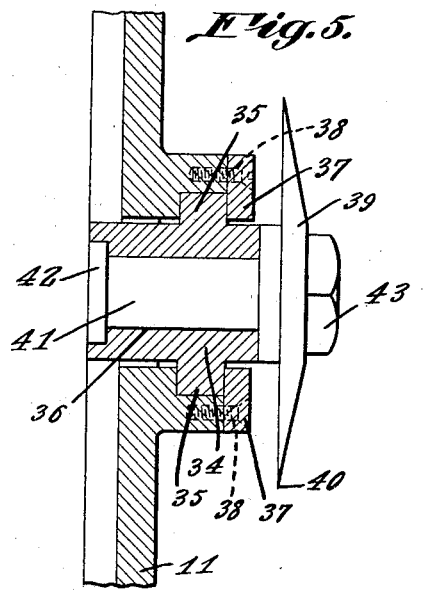
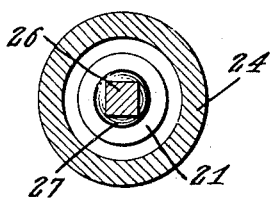

UNITED STATES PATENT OFFICE.

CHARLES RASMUSSEN, OF RACINE, WISCONSIN, ASSIGNOR OF ONE-HALF TO RALPH T. INGALLS, OF RACINE, WISCONSIN.

TIRE-CUTTING MACHINE.

1,357,899.   Specification of Letters Patent.   Patented Nov. 2, 1920.

Application filed April 8, 1920. Serial No. 372,277.

*To all whom it may concern:*

Be it known that I, CHARLES RASMUSSEN, a citizen of the United States, residing at Racine, in the county of Racine and State of Wisconsin, have invented a new and useful Tire-Cutting Machine, of which the following is a specification.

This invention has reference to rubber cutting machines, and more particularly to machines especially designed for cutting tires such as are used on motor vehicles, into sections for distribution as advertising purposes.

The primary object of the invention is to provide a device of this character including a rotary knife, together with means for adjustably supporting the same, to facilitate the use of the device in cutting tires of various sizes.

A further object of the invention is to provide a cutting machine wherein the cutting tool operates under the pressure applied to the cutter supporting frame, thus eliminating the necessity of applying rotary motion directly to the cutting element.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a plan view of a rubber tire cutting machine constructed in accordance with the present invention.

Fig. 2 illustrates a side elevational view of the same.

Fig. 3 illustrates a sectional view taken on line 3—3 of Fig. 2.

Fig. 4 illustrates a sectional view taken on line 4—4 of Fig. 3.

Fig. 5 illustrates a sectional detail view of the rotary cutting element and its support.

Fig. 6 illustrates a sectional view taken on line 6—6 of Fig. 3.

Referring to the drawings in detail, the reference character 5 designates the base of the machine, which is shown as including a flange 6 disposed at the bottom thereof, which flange is provided with suitable openings to receive the securing bolts 7 for rigidly supporting the frame of the machine.

The upper surface of the body 5 is cut away as at 8 to provide a clearance for the bearing 9 which supports the relatively large hollow shaft 10 formed integral with the gear wheel 11, to be hereinafter more fully described.

This bearing 9 includes the upper and lower sections 12 and 13, which sections are bolted to the body 5 by means of the bolts indicated at 14 so that the bearing sections will embrace the shaft 10 in a manner to permit the shaft to revolve in its bearings but prevent lateral displacement thereof, when the shaft is in operation.

The shaft 10 is provided with an annular shoulder 15 engaging one of the edges of the bearing 9 to prevent lateral displacement of the shaft 10, in one direction, while at the opposite end of the shaft 10 is arranged an annular securing member 16, the same being secured to the shaft 10 by means of the bolts 17, and as shown this member 16 is wider than the thickness of the shaft 10 to present a flange contacting with the opposite edge of the bearing 9 to prevent displacement of the shaft 10 laterally, in the opposite direction.

Supported at one end of the bearing 9, is a head 18 which is provided with a cut out portion to accommodate the annular member 16. An extension 19 forms a part of the head 18, and this extension 19 is provided with a removable threaded bearing 20 in which operates the screw 21 controlled by the hand wheel 22 disposed at one end thereof, and which hand wheel is maintained in predetermind positions by means of the locking element 23 also positioned on the screw 21.

Coöperating with the head 18 is a sleeve 24 secured to the head by means of the bolts 25. The sleeve 24 provides a housing for one end of the screw 21, and the connecting arm 26 which is provided with a ball 27 formed on one end thereof, which ball is seated in a curved recess 28 formed in one end of the screw 21 to permit the screw 21 to revolve with relation to the head and arm.

The arm 26 has pivotal connection with one of the arms of the bell crank lever 29 which has pivotal connection within the hollow shaft 10 as by means of the apertured ears 30 formed integral with the shaft 10 and extending inwardly from one of the side walls thereof, there being provided a spring member 31 for connecting one of the arms of the bell crank lever 29 to the flange 16 for normally urging the bell crank lever toward the head 18. From the foregoing it will be seen that rotary movement of the screw 21 in one direction, moves one of the arms of the bell crank lever against the tension of the coiled spring 31 to accomplish an adjustment, to be hereinafter more fully described.

The gear wheel 11 is relatively large and is provided with a slotted portion 32 providing a guide-way and support for the cutting element 33, which is shown as disposed between the side walls of the slotted portion and supported therein in a manner to permit the same to be adjusted to various positions within the slotted portion. A carriage 34 forms a part of the cutting element and supports the same in proper relation with the gear wheel 11, which gear wheel is provided with a cut out portion to receive the lateral ribs 35 formed on the carriage 34. Securing strips 37 have connection with the gear wheel through the screws 38, which strips contact with the sides of the flanges 35 for securing the carriage 34 to the gear wheel 11 in a manner to permit sliding movement of the carriage 34 with relation to the gear wheel 11.

The rotary cutting element is in the form of a disk indicated at 39 which has a beveled surface presenting the cutting edge 40, the disk being keyed or otherwise secured to the shaft 41, to move therewith, the shaft being provided with the head 42 at one end thereof for supporting the same within the bearing 36 formed in the carriage 34 while the nut 43 is provided on the opposite end of the shaft for securing the disk 39 thereto.

Apertured ears 44 are formed on the carriage 34 and between which one end of the arm 45 is connected, the opposite end thereof having pivotal connection with one of the arms of the bell crank lever 29 as at 46, so that movement of the bell crank lever 29 will result in a relative movement of the carriage 34 within the slotted portion of the gear wheel 11.

The power shaft 47 is supported in the bearing 48, and carries on one end thereof the power pulleys 49, the opposite end thereof supporting the gear 50 which is in mesh with the gear 11 to cause the same to revolve with its shaft 10.

Supported by the body 5, is the curved mandrel 51 which has one of its ends disposed within the path of travel of the cutting element 39, the mandrel being shown as connected to the body 5 through the medium of the bracket 52, extending laterally therefrom, and secured to the frame by means of the bolts 53.

Coöperating with the mandrel 51, is the clamping element 54 which includes upper and lower arms 55, each of which has pivotal connection with the bracket 56, so that arms may move toward and away from each other to accomplish the clamping result.

A portion of each of the arms 55 is curved as at 56′ so that the same will conform to the curvature of a tire supported on the mandrel 51 for clamping the tire thereto, there being provided a shaft 57 and hand wheel 58 for moving the arms 55 with relation to each other.

In the operation of the device, a rubber tire casing is positioned over the mandrel 51 and the arms 55 are moved into engagement therewith to clamp the casing against movement on the mandrel. The hand wheel 22 is now rotated to cause the cutting element 39 to be moved into engagement with the casing under operation. Power is now applied to the shaft 47 through one of the power pulleys 49 which has connection with a suitable power element not shown, with the result that the gear wheel 50 is revolved causing the gear wheel 11 to revolve around the mandrel 51 severing a portion of the casing.

The hand wheel 58 is now operated to release the casing, whereupon the casing is again moved until the end thereof lies flush with one end of the mandrel 51, whereupon the operation of the machine is repeated.

It is obvious that the carriage which supports the cutting element may be moved toward and away from the mandrel 51 to permit the same to be employed for cutting tire casings of various thicknesses.

Having thus described the invention, what is claimed as new is:—

1. In a cutting machine, a base, a mandrel supported by the base, a hollow shaft supported by the base, and operating adjacent to one end of the mandrel, a carriage adjustably supported with relation to the shaft, means supported within the hollow shaft and having connection with the carriage for moving the carriage, a rotary cutting disk supported on the carriage, and means for revolving the rotary cutting disk around the mandrel.

2. In a cutting machine, a base, a mandrel supported by the base, means coöperating with the mandrel for clamping material thereto, a hollow shaft supported by the base, a gear wheel formed integral with the shaft, an adjustable carriage supported by the gear wheel, a bell crank lever supported within the hollow shaft and having connection with the adjustable carriage, threaded means having connection with the bell crank lever for adjusting the carriage with relation to the mandrel, means for securing the threaded means in predetermined positions of adjustment, and means for causing the cutting disk to revolve around the mandrel.

3. In a cutting machine, a base, a mandrel supported by the base, means for clamping material to the mandrel, a hollow shaft supported by the base, a bell crank lever pivoted within the hollow shaft, a gear wheel forming a part of the hollow shaft, said gear wheel having a slotted portion, a carriage movable between the walls of the slotted portion, said carriage carrying a rotary cutting disk, means for connecting the bell crank lever and carriage, adjustable means having connection with the bell crank lever for moving the carriage, and cutting disk with relation to the mandrel, and means to cause the rotary cutting disk to revolve around the mandrel.

4. In a cutting machine, a base, a mandrel supported by the base, means for clamping material to the mandrel, a hollow shaft supported adjacent to one end of the mandrel, an adjustable carriage movable with the hollow shaft, a bell crank lever pivoted within the hollow shaft, means for connecting the bell crank lever and adjustable carriage, whereby movement of the bell crank lever produces a relative movement of the carriage, a screw having connection with the bell crank lever for moving the same, a rotary cutting disk mounted on the carriage and adapted to move therewith, and means to cause the rotary cutting disk to revolve around the mandrel.

5. In a cutting machine, a base, a mandrel supported by the base, a hollow shaft supported by the base and operating adjacent to one end of the mandrel, apertured ears formed interiorly of the hollow shaft, a bell crank lever pivotally supported by the apertured ears, a gear wheel formed integral with said hollow shaft, guideways forming a part of the gear wheels, a carriage operating in the guideways and carrying a rotary knife, an arm connecting the carriage and bell crank lever for moving the rotary knife with respect to the mandrel, and adjusting means having connection with the bell crank lever for moving the arm.

6. In a cutting machine, a base, a mandrel supported by the base, a hollow shaft operating adjacent one end of the mandrel, a gear wheel formed integral with the hollow shaft, an adjustable knife supporting carriage supported by the gear wheel, means disposed within the hollow shaft for adjusting the knife toward and away from the mandrel, and means for operating the gear wheel.

In testimony that I claim the foregoing as my own, I have hereto affixed my signature in the presence of two witnesses.

CHARLES RASMUSSEN.

Witnesses:
R. T. INGALLS,
T. J. SANTRY.